United States Patent [19]

Yogev et al.

[11] Patent Number: 5,638,395

[45] Date of Patent: Jun. 10, 1997

[54] OPTICALLY PUMPED LASER APPARATUS

[75] Inventors: Amnon Yogev, Rehovot; Vladimir Krupkin, Rishon LeZion, both of Israel

[73] Assignee: Yeda Research and Development Co., Ltd., Israeli Company of The Weizmann Institute of Science, Rehovot, Israel

[21] Appl. No.: 377,335

[22] Filed: Jan. 24, 1995

[30] Foreign Application Priority Data

Jan. 26, 1994 [IL] Israel .......................................... 108439

[51] Int. Cl.⁶ ........................... H01S 3/091; H01S 3/092
[52] U.S. Cl. ................... 372/71; 372/66; 372/99
[58] Field of Search ..................... 372/66, 71, 72, 372/79, 99

[56] References Cited

U.S. PATENT DOCUMENTS

| | | |
|---|---|---|
| 3,939,439 | 2/1976 | Fletcher et al. . |
| 3,946,333 | 3/1976 | Chitakyan et al. ............. 372/79 |
| 4,045,749 | 8/1977 | Burnham et al. . |
| 4,445,217 | 4/1984 | Acharekar .................... 372/53 |
| 4,697,272 | 9/1987 | Harvey ....................... 372/96 |
| 4,751,716 | 6/1988 | Ream et al. ................... 372/66 |
| 4,839,902 | 6/1989 | Guch ......................... 372/72 |
| 4,858,240 | 8/1989 | Pöller et al. .................. 372/92 |
| 4,918,703 | 4/1990 | Kukla ........................ 372/72 |
| 5,022,038 | 6/1991 | Bradley . |
| 5,048,044 | 9/1991 | Ireland ....................... 372/66 |
| 5,086,433 | 2/1992 | Pocholle et al. ............... 372/72 |
| 5,373,527 | 12/1994 | Taniu et al. .................. 372/71 |

OTHER PUBLICATIONS

"Continuous Sun–Pumped Room Temperature Glass Laser Operation", G. R. Simpson, Applied Optics, Jun. 1964, vol. 3, No. 6, pp. 783–784.

"A Solar–Pumped cw 18 W Nd:YAG Laser", Haruo Arashi et al., Research Institute for Scientific Measurements, May 26, 1984, pp. 1051–1053.

"Threshold Pump Power of a Solar–Pumped Dye Laser", Ja H. Lee et al., Appl. Phys, Lett. 53 (21), 21 Nov. 1988, pp. 2021–2022.

"A Sun–Pumped cw One–Watt Laser", C.G. Young, Applied Optics, Jun. 1966, vol. 5, No. 6, pp. 993–997.

"Thermal Effects on Cavity Stability of Chromium–and Neodymium–doped Gadolinium Scandium Gallium Garnet Lser Under Solar–Simulator Pumping", Kyong H. Kim, et al., J. Appl. Phys. 69 (5), 1 Mar. 1991, pp. 2841–2848.

"Sun–Pumped Lasers: Revisiting an Old Problem with Non-imaging Optics", Dave Cooke, Applied Optics, vol. 31, No. 36, 20 Dec. 1992, pp. 7541–7546.

"Approaching the Irradiance of the Surface of the Sun", R. Winston, et al., Solar Thermal Technology: Research Development and Applications, Jan. 1990, pp. 579–586.

Primary Examiner—Rodney B. Bovernick
Assistant Examiner—Robert E. Wise
Attorney, Agent, or Firm—Wigman, Cohen, Leitner & Myers, P.C.

[57] ABSTRACT

A laser apparatus of the end pumping kind in which an elongated transparent laser element is mounted in spaced relationship within a tubular waveguide which has a highly reflective inner surface. The arrangement is such that, at least along part of the laser element, the optical distances between different points on the surface of the laser element and the inner contour of the waveguide vary.

23 Claims, 4 Drawing Sheets

OPTICALLY PUMPED LASER APPARATUS

FIELD OF THE INVENTION

The invention relates to optically pumped laser apparatus of the kind that comprises elongated laser elements, and aims at improving the pumping efficiency of such apparatus.

BACKGROUND OF THE INVENTION

In the following a laser light generating apparatus will be referred to for short as a laser device.

In optically pumped laser devices, a laser beam is generated whenever pumping light absorbed by the laser element excites the latter to a stage that gives rise to a so-called inverted population of atoms. The power of the generated laser beam depends on the energy per unit volume absorbed by the laser element, which in turn depends on the energy, i.e. brightness of the impinging pumping light and the reduction as far as possible of pumping light losses. The brightness of light impinging on the surface of a laser element is limited by the second law of thermodynamics and cannot exceed the brightness of the extraneous light source. Consequently, for achieving good laser action, very bright light sources with suitable imaging and non-imaging concentration optics are usually used.

Depending on design, a laser element may be illuminated at the side, which is referred to in the art as side-pumping (see for example H. Arashi et at., in "A Solar-Pumped cw 18W Nd:YAG Laser", *J. Journal Applied Physics*, Vol. 23 No. 8, pp. 1051–1053, 1984), or at one of the ends which is referred to in the art as end-pumping (see for example J. Falk, L. Huff and J. D. Taynai, "Solar-Pumped, Mode-Locked Frequency-Doubled Nd: Yag Laser", Conference on laser engineering and appliances IEEE/OSA, May 28–30, 1975).

Side-pumping provides a rather homogenous distribution over the laser element, but due to the usually thin optical density of the laser material, a significant part of the light is not absorbed and the yield is poor.

For end-pumping, the illuminating light is usually concentrated to a spot having a cross-sectional area that at least matches that of the laser element, which provides for absorption of all or most of the pumping light, but the pumping energy in such a case is non homogeneously distributed over the laser element and is limited by the cross-section area of the laser element and by the brightness of the source of pumping light.

The shape of a laser element is selected according to the desired power and quality of the generated laser beam with due regard also to the heat dissipation capability, and in many cases elongated laser elements are preferred with a large length-to-width ratio such as rods, slabs, fibers of solid active material and transparent elongated tubes filled with liquid or gaseous active material. Elongated laser elements are less sensitive to losses in the laser resonator and they create less thermal problems of the kind that are liable to give rise to undesirable side effects. Thus, since excitation occurs throughout the body of the laser element while heat dissipation occurs only at the surface, large thermal gradients are formed which may cause fractures in the element and strongly affect the laser beam quality.

Solid laser elements in the shape of thin elongated bodies such as rods are less susceptible to thermal gradients. However, the use of elongate thin laser elements gives rise to efficiency problems. Thus, when in the case of end-pumping, the cross-sectional area of the illuminating light beam is larger than that of the laser element, there occur significant energy losses due to the fact that not all of the oncoming light impinges on the laser element. Side-pumping of thin rods is also inefficient due to low optical density.

Attempts have been made to improve the lasing efficiency of elongated thin laser elements by concentrating the oncoming extraneous pumping light beam by use of a converging cone. This, however, did not overcome the efficiency problem. Thus, when the cross-sectional area of the exit end of the impinging pumping beam matches the cross-sectional area of the laser element, the input power and with it the output power is limited by the very fact that the cross-sectional area of the laser element is small. If on the other hand, the exit end of the impinging pumping light beam has a cross-sectional area larger than that of the laser element, only a central portion of the oncoming beam impinges on the end portion of the laser element while the askew fringe portions only partly impinge on the side of the laser element and in doing so provide for low power density, even lower than when exclusively side pumping is applied. Depending on the convergence angle of the oncoming beam and the length of the laser element, some of the oncoming pumping light may not impinge at all on the element.

It has also been proposed (G. R. Simpson, "Continuous Sun-Pumped Room Temperature Glass Laser Operation", *Applied Optics*, Vol. 3 No. 6, pp. 783–784, 1964) to make an optically pumped laser device by placing an elongated laser element within a tubular waveguide having a reflective inner surface. In operation, the cross-sectional area of the incoming activating light beam corresponds to that of the inner hollow space of the tubular waveguide with the consequence that a first portion of the incoming light impinges on the end of the laser element, a second portion which impinges askew on the inner waveguide surface, bounces within the waveguide and across the laser element so as to intersect it at least once thereby producing a side-pumping effect, while a third portion which also impinges askew on the inner waveguide surface, is reflected in such a manner as not to intersect at all the laser element and is thus lost.

It has further been proposed to design a laser device for pumping with concentrated solar radiation by placing a cylindrical rod-shaped laser element within a funnel-shaped frusto, conical envelope having an inner reflective surface and whose narrow end fits snugly over the distal end portion of the laser rod (see C. G. Young, "A Sun-Pumped cw One-Watt Laser", *Applied Optics* Vol 5, No. 6, pp. 993–997, 1966). The size of the input opening of the funnel around the fore, pumping end of the laser element, is designed to match the cross-sectional area of the incoming pumping beam, e.g. concentrated solar radiation. The pumping efficiency of such a laser is better than of the J. R. Simpson laser device described above, but nevertheless the author mentions that here too a portion of the incident light is rejected by being reflected out of the funnel, while another portion that bounces within the funnel across the laser element, is attenuated in the course of bouncing with the consequence that the output power is low.

It is the object of the present invention to provide an optically pumped laser light generator with an elongated laser element with improved power output.

SUMMARY OF THE INVENTION

The purpose of this invention is to provide a laser device of the kind having an elongated laser within a tubular waveguide and in which the cross-sectional area of the pumping light beam is significantly larger than that of the laser element, with means for increasing the pumping efficiency.

According to the present invention, there is provided a laser apparatus of the end pumping kind in which an elongated transparent laser element with near and distal ends and a longitudinal axis is mounted in spaced relationship within a tubular waveguide having near and distal ends and a highly reflective inner surface, characterized by means by which at least along part of the laser element the optical distances between different points on the surface of the laser element and the inner contour of the waveguide in a cross-sectional plane normal to said longitudinal axis of the device vary.

The term "optical distance" signifies the shortest way of a light beam between a point on the laser element and the inner reflective surface of the waveguide.

By one embodiment, variations of the optical distances between points on the laser element and the reflective inner surface of the tubular waveguide is provided by irregularities of the reflective surface, e.g. in the form of corrugations. By another embodiment, the optical distances are varied by the provision of bodies within the waveguide having a refractive index or refractive indices different from that of the surrounding medium and from the material of the laser element. It is preferable if the irregularities of the reflector surface or of the optical characteristics of the medium between the laser element and the tubular waveguide are constant in an axial direction.

As mentioned, in a conventional laser device of the kind specified having an elongated laser element within a tubular waveguide and which is end pumped by a concentrated light beam having a cross-sectional area larger than that of the laser element, a first part of the incoming pumping light impinges on the end portion of the laser element and thus serves for direct end pumping; a second part propagates within the waveguide intersecting the laser element at least once, of which in consequence of attenuation only a fraction of it is capable of exiting a portion of the laser element close to the near end while the distal portion is not exited; and a third part which is mostly defined by skew rays, and which propagates close to the reflector wall with which it forms a small angle and leaves the waveguide without encountering the laser material, thus not participating in the pumping process. In accordance with the present invention both said second and especially third parts of the pumping light beam are retrieved and utilized for side pumping in essentially homogenous distribution along the laser element, including its distal portion, without any adverse effect on the end pumping. This signifies superior efficiency achieved in accordance with the present invention, due to an increased number of intersections of the pumping light with the laser element in consequence of deflections brought about by the above specified design.

Thus, in a laser device constructed according to the teachings of the present invention, the propagation conditions of the pumping light are engineered in such a fashion as to improve pumping efficiency and to achieve a more homogeneous absorption of the oncoming pumping light.

In a laser device according to the invention, the cross-sectional area of the tubular waveguide $S_{tube}$ is larger than the cross-sectional area $S_{las}$ of the laser element, and the length $l_s$ of the laser element is correlated to the cross-sectional area of the tubular waveguide by the equation $$l_s = \frac{l_{abs}}{k} \cdot \frac{S_{tube}}{S_{las}}$$

where $l_{abs}$ is the absorption length of the laser material and k is in the range of 0.5–2 depending on whether the exiting light which propagates within the tubular waveguide is unidirectional and bidirectional.

If desired, in a laser device according to the invention, the tubular reflector may have converging walls. Further if desired, a cooling arrangement may be provided in a laser device according to the invention. Still further, a back reflector may be provided at the distal end of the tubular waveguide.

These and other features of the present invention will become apparent from the following specific disclosure.

BRIEF SUMMARY OF THE DRAWINGS

For a better understanding of the present invention it will now be described, by way of example only, with reference to the accompanying drawings in which.

DETAILED DESCRIPTION OF THE PREFERRED EMBODIMENTS

Figure 1:
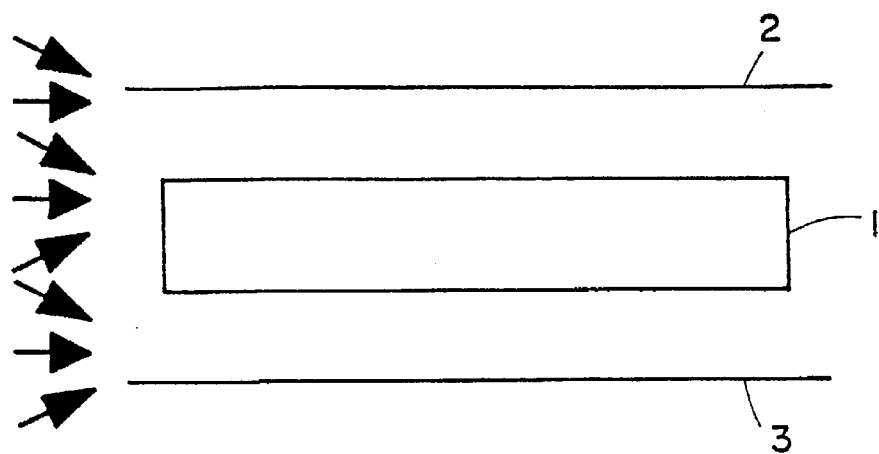
FIG. 1 is a schematic illustration of a prior art end pumped laser device in which a laser element is placed in a cylindrical waveguide.

FIG. 1 shows a prior art laser device having an elongated transparent laser element in form of a cylindrical rod 1 mounted within a round tubular waveguide 2 having a highly reflective inner surface 3. The cross-sectional area of the tube 2 is significantly larger than that of the laser element 1. End pumping with an extraneous concentrated light source (not shown) e.g., concentrated solar radiation, is used to illuminate the near ends of tubular waveguide 2 and laser element 1, with the cross-sectional area of the pumping beam admitted into waveguide 2 corresponding intrinsically to that of tube 2.

As the inner surface 3 of tube 2 is highly reflective, tube 2 acts as a waveguide, in particular for rays of the pumping light which form acute angles with the reflective surface. These rays bounce between opposite sides of the reflective surface 3 while propagating from one end of the tube to another, intersecting the laser element 1 and crossing it at least once and possibly several times.

Some of the rays of the incoming pumping beam impact upon the reflective surface 3 at such an acute angle that the reflected rays do not intersect at all the laser element 1 and that portion of the pumping light is lost.

To ensure effective pumping, the surface area of the laser element exposed to the exciting light should be greater than the area of the near end of the tube. In the case of a rod-like laser element, for maximization of light absorption, the length of the rod is selected so as to fulfill the relationship $2\pi \cdot r_1 \cdot l > \pi \cdot r_2^2$, where $r_1, r_2$ are the radii of the laser rod 1 and the tube 2 respectively, and l is the rod length. The overall length of the laser system $l_s$ can be optimized taking into consideration the absorption coefficients of the laser material $$l_s = \frac{l_{abs}}{k} \cdot \frac{S_{tube}}{S_{las}}$$

where $S_{tube}$ and $S_{las}$ are, respectively, the cross-sectional area of tube 2 and of the laser element 1, $l_{abs}$ is the absorption length of the laser element, and k=1 or 2, depending on whether the exciting light propagation is uni- or bidirectional.

Essentially, the laser devices according to the invention are of the kind described with reference to FIG. 1 with the addition of means for improving the pumping efficiency, which are directed to ensure that at least most of the pumping light propagating in the tubular waveguide will intersect with and be absorbed by the laser material, that pumping power density will be kept at a maximal level close to a power density of the pumping source or at the entrance of the tubular waveguide, that no pumping light will be rejected, and that the volume of the tubular waveguide and of the laser material will be minimized to that sufficient for absorption.

Figure 2:
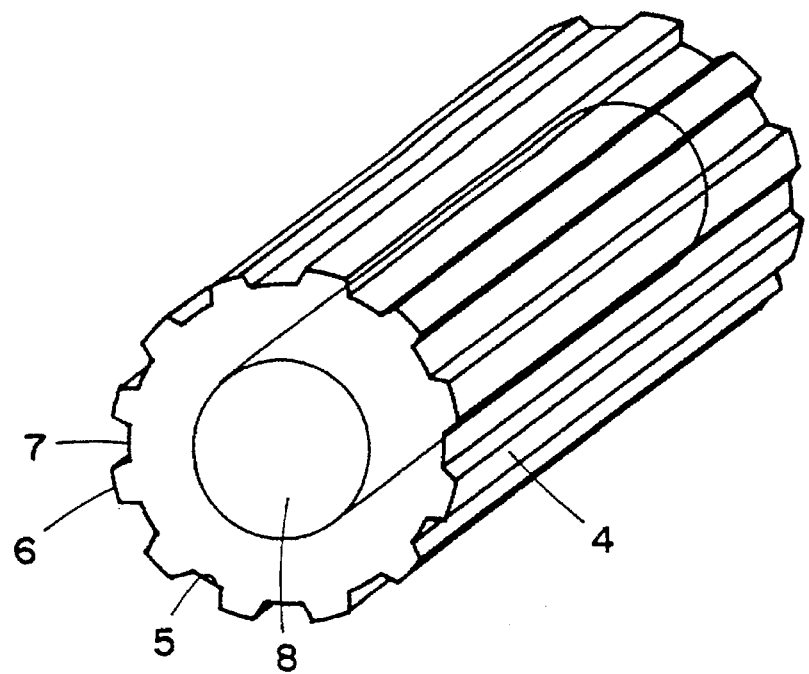
FIG. 2 is a schematic illustration of one embodiment of a laser device according to the present invention.

FIG. 2 shows one embodiment of a laser device made in accordance with the teachings of the present invention.

As shown, a tubular waveguide 4 is corrugated so that the inner, reflective surface 5 of waveguide 4 has a plurality of alternating furrows 6 and ridges 7. In consequence, within any cross-sectional plane of the device, the optical distance between points on the elongated cylindrical laser element 8 and the inner surface 5 of waveguide 4 varies along the contour of waveguide 4. Due to this feature, significantly more of the pumping light intersects with the laser element 8 and is utilized for pumping than in the device of FIG. 1.

Figures 3, 4:
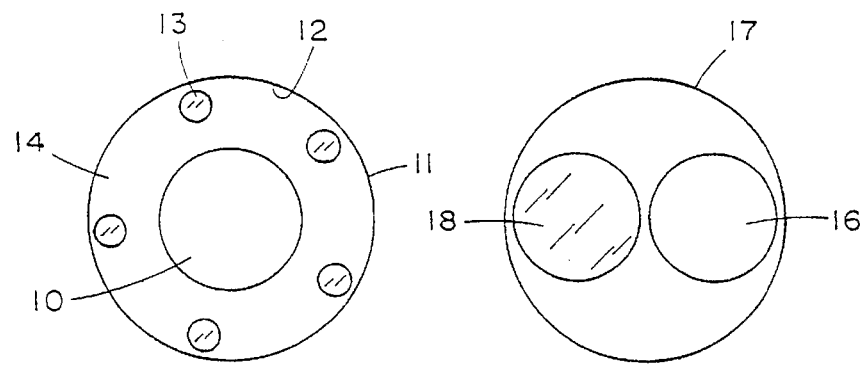
FIGS. 3, 4, 5 and 6 are schematic illustrations of four further embodiments of laser devices according to the present invention.

FIG. 3 illustrates another embodiment of varying the optical distance in the manner specified. As shown, the device here comprises an elongated cylindrical laser element 10 enclosed within a tubular waveguide 11 having an inner reflective surface 12. Within the space between element 10 and waveguide 11 are located a plurality of transparent cylindrical rods 13 having a refractive index different from that of the surrounding medium 14 and also from that of the laser element 10. Due to the presence of rods 13, the optical distances between points on the laser element 10 and reflective surface 12 vary. In operation most of the incident pumping light is deflected by rods 13, and light that is not utilized for end pumping is caused to effect such pumping all along laser element 10. It should be mentioned that the rods 13 may have additional fluorescent properties.

In the embodiment illustrated by FIG. 4, an elongated cylindrical laser element 16 is eccentrically mounted within a tubular waveguide 17 close to its wall, whereby the optical distances between points on the laser element 16 and the reflective inner surface of the waveguide 17 vary. The device may further comprise a cylindrical transparent rod 18 mounted within waveguide 17 in the manner shown. The refractive index of rod 18 is different from that of laser element 16 and of the surrounding medium. Essentially the operation of this embodiment is similar to that of FIG. 3.

Figure 5:
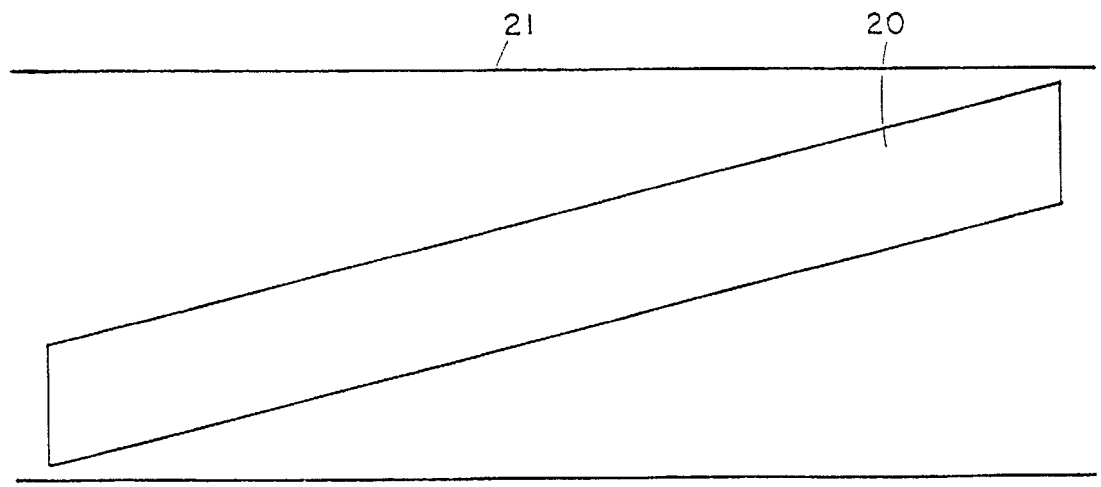

In the embodiment of FIG. 5 an elongated laser element 20 is mounted askew within a waveguide 21 which cause a continuous variation of the optical distances between the laser element and the inner reflective surface of the waveguide, so that different portions of the pumping light intersect with the different portions of the laser element 20.

Figure 6:
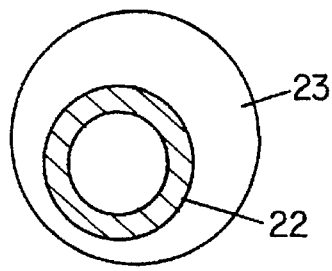

In the embodiment of FIG. 6, the laser element 22 is tubular and is held within a tubular waveguide 23. The optical distance of each point on the inner surface of the laser element to the near part of the waveguide is different from that of each point on the outer surface of the laser element. Eventually, all the light propagated in the tubular waveguide 23 intersects with the laser element 22.

Figure 7:
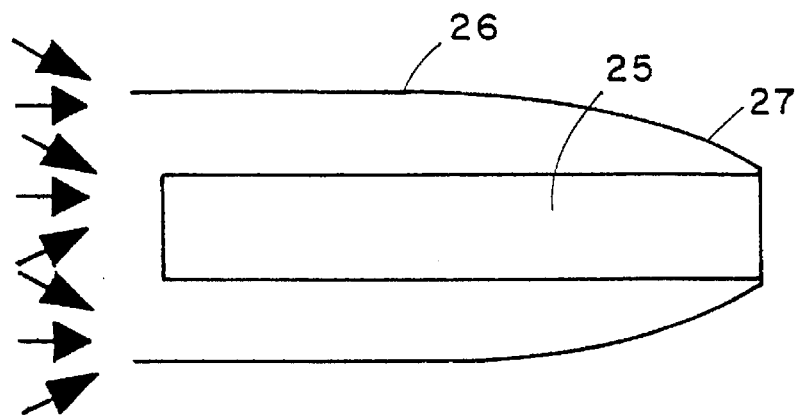
FIG. 7 is a schematic illustration of a specific feature of a laser device according to the present invention.

In the embodiment of FIG. 7, a cylindrical elongated laser element 25 is mounted within a waveguide 26 having a distal conical end portion 27 fitting snugly over the distal end portion of laser element 25. The waveguide 26 may have a corrugated design similar to that shown in FIG. 2. In this embodiment the erosion of power density of the light propagating in the waveguide 26 is compensated by the concentrating feature of the conical end 27, whereby the lasing efficiency is maximized.

Figure 8:
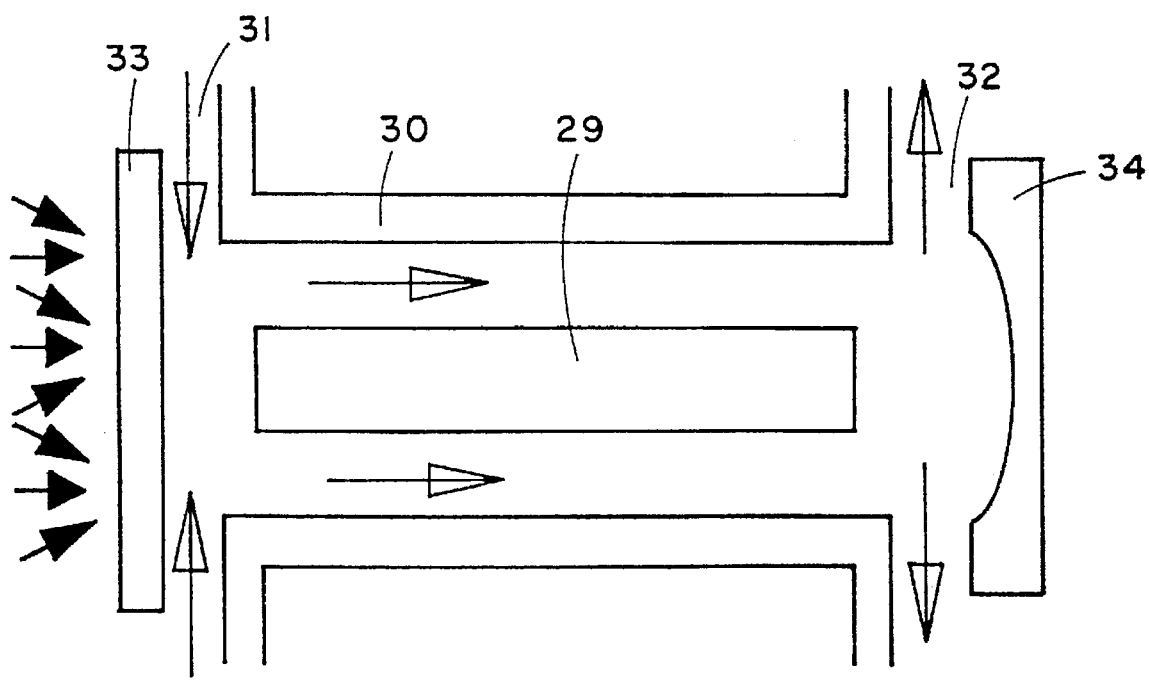
FIG. 8 is a schematic illustration of still another embodiment of a laser device according to the present invention.

In the embodiment of FIG. 8, a cylindrical elongated laser element 29 is mounted within a tubular double walled waveguide 30 which is designed for cooling, the coolant entering via inlets 31, flowing within the inner tubular space of waveguide 30 in the directions of the arrow, and leaving via outlets 32. In addition, the coolant may have fluorescent properties. A transparent window 33 transmits the incoming pumping light, and any unabsorbed light passing waveguide 30 is reflected back by an inclined or non-flat (e.g. concave) mirror 34.

Figure 9A:
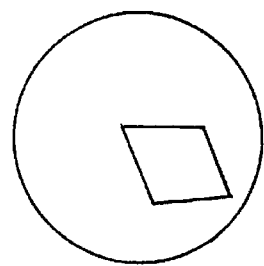
FIGS. 9A and 9B illustrate examples of laser elements 40 having a non-circular cross-section.
Figure 9B:
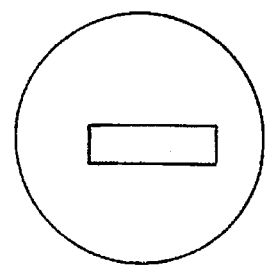

It should be mentioned that, in all of the embodiments, the laser element 40 may have a non-circular cross-section, for example, the form of a slab 5 shown in FIGS. 9A and 9B. The high reflection from the inner surface of the waveguide may be achieved by providing a total internal reflection. The light used to pump an apparatus according to the invention originates from a lamp, from another laser, or from sunlight.

In the experiment utilising features illustrated in FIGS. 5 and 8, a Nd:YAG laser rod 29 having diameter of 3-mm and length of 30-mm was imbedded in a quartz tube 30. The outer diameter of the tube was 6-mm, the inner diameter was 5-mm and the tube length was 25-mm. The outer surface of the tube was surrounded by air. The tube ends were welded to quartz disks which were glued into an aluminum body. The laser rod was inclined relative to the quartz tube axis to form an angle of 3.5°. An organic coolant with refractive index of 1.5 flowed in the direction shown by arrows 31, 32 and reduced Fresnel reflections at the laser rod's surface. An anti-reflection coated quartz window 33 with thickness of 2-mm separated cooling channels from outside atmosphere. The laser rod had reflective dielectric coating at both ends, which formed a laser resonator. The end of the rod placed at the window 33 had high reflection coating R>99.5% at 1.064-nm). The other end had partially transparent coating (R>95% at 1.064-nm) and served as output laser mirror. A concave aluminum mirror 34 having radius of curvature of 10-mm was placed at the distance 1-mm to the tube. The mirror had a hole of 3-mm diameter and was connected with the laser rod (that is not shown in the figure). The laser output radiation passed through the hole to a power meter. The quartz tube 30 was illuminated through the window 33 by concentrated solar radiation. This solar radiation was collected by an aluminum parabolic dish of 600-mm diameter and 350-mm focal distance into a spot of 6-mm diameter. The power of concentrated solar radiation was measured to be 150-watts at direct solar insulation of 866-watts/m². The pumping solar radiation was trapped in the quartz tube due to the total internal reflection effect at the outer surface of the tube. The pump radiation propagated in the tube to the aluminum mirror 34, reflected and turned to the window 33, many times passing through the laser rod 29. In this way the pump power density in the laser material was 1-KW/cm². The laser output power was measured to be 9.2 watt and the divergence of laser radiation was less than 15-mrad. The laser operated 8 times above the threshold. The efficiency of laser was 6.1%, that is 2 times higher than the best results reported by J. Falk for a same size Nd:YAG laser rod (J. Falk, L. Huff and J. D. Taynai, "Solar-Pumped, Mode-Locked, Frequency-Doubled Nd: Yag Laser", Conference on Laser Engineering and Appliances IEEE/OSA, May 28–30, 1975).

The increase in the laser output power was due to the absorption of skew rays by the tilted laser rod and to the absorption of the pumping radiation turned back to the quartz window after the redirection of non-absorbed skew rays by the concave mirror. The same laser rod in an ordinary arrangement, i.e. when it is not inclined and when the concave mirror is not used, produced only 3.2 watts of output power.

The experiments with grooved outer surface tubes are in progress. This construction has ability to provide laser efficiency above 10% for Nd:YAG and above 20% for Nd:Cr:GSGG.

We claim:

1. A laser device of the end pumping kind having a longitudinal axis, wherein an elongated transparent laser element having a surface and near and distal ends is mounted in spaced relationship within a tubular waveguide having near and distal ends and a highly reflective inner surface, and wherein, in any given single cross-sectional plane normal to said longitudinal axis of the device and taken along at least part of the laser element, optical distances between different points on the surface of the laser element and the inner surface of the waveguide vary.

2. A laser device according to claim 1, wherein said laser element is a tubular laser element.

3. A laser device according to claim 1, wherein the distal end of said tubular waveguide is associated with light reflector means.

4. A laser device according to claim 1, comprising means for flowing a coolant through said tubular waveguide.

5. A laser device according to claim 4, wherein said coolant has fluorescent properties.

6. A laser device according to claim 1, wherein the high reflection of the inner surface of said tubular waveguide is provided by total internal reflection.

7. A laser device according to claim 1, wherein said elongated laser element is cylindrical.

8. A laser device according to claim 1, wherein said elongated laser element has a non-circular cross-section.

9. A laser device according to any one of claims 2 and 3–8, wherein the pumping light originates from another laser device.

10. A laser device according to claim 1, wherein the pumping light originates from a lamp.

11. A laser device according to claim 1, wherein the pumping light is sunlight.

12. A laser device according to claim 1, wherein variations of the optical distances between points of the laser element and the reflective inner surface of the tubular waveguide are provided by a variation of optical distance between the reflective surface of the waveguide and said longitudinal axis of the device.

13. A laser device according to claim 1, wherein variations of the optical distances between points of the laser element and the reflective inner surface of the tubular waveguide are provided by a variation of optical distance between the surface of the laser element and said longitudinal axis of the device.

14. A laser device of the end pumping kind having a longitudinal axis in which an elongated transparent laser element having a surface with near and distal ends is mounted in spaced relationship within a tubular waveguide having near and distal ends and a highly reflective inner surface, having optical distances between different points on the surface of the laser element and the inner contour of the waveguide in a cross-sectional plane normal to said longitudinal axis of the device which vary along at least part of the laser element, wherein variations of the optical distances between points on the laser element and the reflective inner surface of the tubular waveguide is provided by irregularities in said reflective surface.

15. A laser device according to claim 14, wherein said irregularities are constant in an axial direction.

16. A laser device according to claim 15, wherein said reflective surface is corrugated.

17. A laser device of the end pumping kind having a longitudinal axis in which an elongated transparent laser element having a surface with near and distal ends is mounted in spaced relationship within a tubular waveguide having near and distal ends and a highly reflective inner surface, having optical distances between different points on the surface of the laser element and the inner contour of the waveguide in a cross-sectional plane normal to said longitudinal axis of the device which vary along at least part of the laser element, wherein the optical distances between different points on the laser element and the inner contour of the waveguide are varied by the provision of bodies within the waveguide having a refractive index or refractive indices different than that of the surrounding medium and from the material of the laser element.

18. A laser device according to claim 17, where said bodies have fluorescent properties.

19. A laser device according to any one of claims 14–18, wherein the pumping light originates from another laser device.

20. A laser device of the end pumping kind having a longitudinal axis in which an elongated transparent laser element having a surface and near and distal ends is mounted in spaced relationship within a tubular waveguide having near and distal ends and a highly reflective inner surface, wherein optical distances between different points on the surface of the laser element and the inner contour of the waveguide in a cross-sectional plane normal to said longitudinal axis of the device vary along at least part of the laser element; and wherein the distal end portion of said tubular waveguide has an essentially conical distal portion fitting snugly on the distal end portion of the laser element.

21. A laser device according to claim 20, wherein the pumping light originates from another laser device.

22. A laser device of the end pumping kind having a longitudinal axis in which an elongated transparent laser element having a surface and near and distal ends is mounted in spaced relationship within a tubular waveguide having near and distal ends and a highly reflective inner surface, wherein optical distances between different points on the surface of the laser element and the inner contour of the waveguide in a cross-sectional plane normal to said longitudinal axis of the device vary along at least part of the laser element; and wherein the cross-sectional area of the tubular waveguide $S_{tube}$ is larger than the cross-sectional area $S_{las}$ of the laser element, and the length $l_s$ of the laser material is correlated to the cross-sectional area of the tubular waveguide by the equation $$l_s = \frac{l_{abs}}{k} \cdot \frac{S_{tube}}{S_{las}}$$

wherein $l_{abs}$ is the absorption length of the laser material for the pumping light, and k=1 or 2 depending on whether the exiting light propagating within the tubular waveguide is unidirectional or bidirectional.

23. A laser device according to claim 22, wherein the pumping light originates from another laser device.

* * * * *